United States Patent [19]
Arbues

[11] Patent Number: 5,490,749
[45] Date of Patent: Feb. 13, 1996

[54] WINCH CONSTRUCTION FOR CARGO TIE-DOWN STRAPS

[76] Inventor: Jose L. A. Arbues, Avda. Páez, Residencias Morichal P.H.B. El Pinar., Caracas - Código Postal 1021, Venezuela

[21] Appl. No.: 392,102

[22] Filed: Feb. 22, 1995

[51] Int. Cl.⁶ .................................................. B61D 45/00
[52] U.S. Cl. ....................... 410/103; 410/100; 24/69 CT; 24/68 CD; 254/218
[58] Field of Search ............................ 410/95–103, 155; 24/68 CT, 68 R, 69 ST, 69 TT, 68 CD; 254/218

[56] References Cited

U.S. PATENT DOCUMENTS

| | | | |
|---|---|---|---|
| 2,946,563 | 7/1960 | Eaton | 410/103 |
| 3,298,324 | 1/1967 | Schwiebert | 410/103 |
| 4,227,286 | 10/1980 | Holmberg | 410/103 |
| 4,510,652 | 4/1985 | von Iperrer | 410/103 |
| 4,913,608 | 4/1990 | Royball | 410/103 |
| 5,156,506 | 10/1992 | Bailey | 410/100 |

Primary Examiner—Michael S. Huppert
Assistant Examiner—Gregory A. Morse
Attorney, Agent, or Firm—Kokjer, Kircher, Bowman & Johnson

[57] ABSTRACT

A winch for securing the tie down straps used to restrain cargo transported on a flatbed vehicle. The winch includes a rigid frame having a rotatable winch drum on which the strap may be wound. A ratchet wheel on the end of the winch drum includes two sets of teeth which are axially offset and circumferentially staggered relative to each other. A pawl for locking the ratchet wheel has two similarly offset and staggered sets of teeth. The teeth of the pawl and ratchet wheel interlock at locations that are both axially and circumferentially offset to distribute the stresses and enhance the structural strength of the winch.

4 Claims, 1 Drawing Sheet

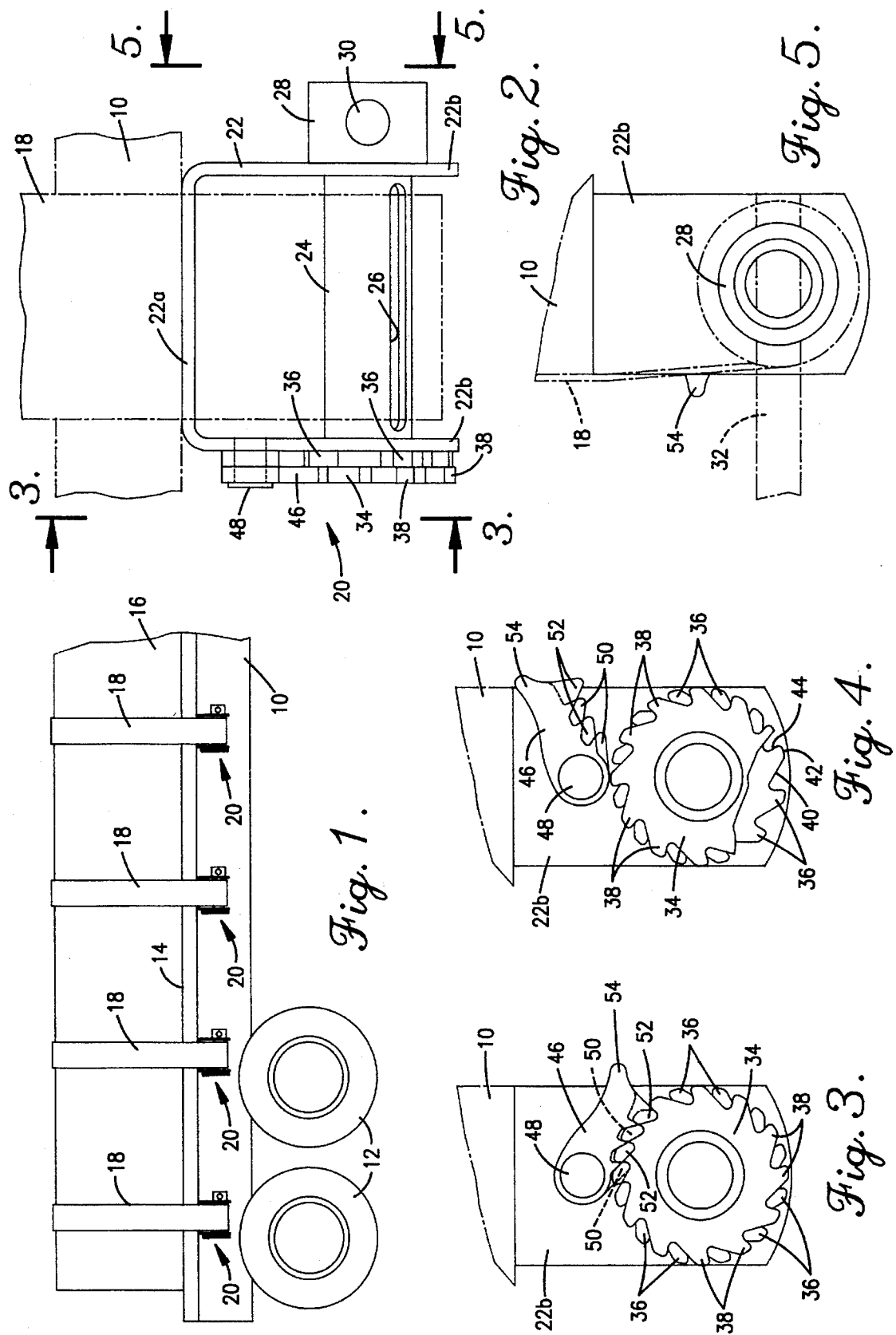

5,490,749

WINCH CONSTRUCTION FOR CARGO TIE-DOWN STRAPS

BACKGROUND OF THE INVENTION

1. Field of the Invention

This invention relates generally to the restraint of cargo and deals more particularly with an improved winch which serves to tighten tie-down straps of the type commonly used to secure cargo carried on flatbed trucks.

2. Description of the Related Art

Cargo that is transported on flatbed trucks and other vehicles is secured to the vehicle bed in a variety of different ways. One common cargo restraint system makes use of cargo straps which are tightened over the cargo in order to hold it down. One end of each strap is hooked or otherwise secured to one side of the truck bed. The straps are drawn over the cargo, and each is applied to a winch mounted on the opposite side of the cargo bed. The winch can be turned in a direction to wind the strap tightly on the winch drum in order to tighten the winch straps on the cargo. A ratchet wheel and a pivotal pawl cooperate to lock the winch drum such that the straps are retained in a tight condition in which they are able to effectively restrain the cargo.

Although this type of restraint system works well with many loads, it has not been without problems. Most notably, the teeth of the ratchet wheel or pawl can break and thus release the strap so that it is unable to restrain the cargo. In order to adequately tie down the cargo, each winch must be turned so that the straps are as tight as possible for maximum restraint of the load. However, because of the tight condition of the straps, the mating teeth of the ratchet wheel and pawl are subjected to considerable forces. The resulting stress can cause one or more teeth to fracture, thus causing failure of the restraint system.

SUMMARY OF THE INVENTION

The present invention is directed to a winch having a ratchet and pawl mechanism that is mechanically and structurally improved in order to avoid the types of failures that have been prevalent in the past.

In accordance with the invention, the ratchet wheel which is carried on the winch drum has two sets of teeth which are located in offset planes and also staggered such that each set has a tooth situated between two adjacent teeth of the other set. The pawl similarly has two sets of teeth which are offset and staggered so that they can mate with the teeth in the corresponding sets on the ratchet wheel.

As a consequence of this staggered and offset tooth arrangement on the ratchet wheel and pawl, two teeth in each set of teeth on the pawl engage two mating teeth in each set of teeth on the ratchet wheel. The result is that four teeth are in engagement to lock the winch drum and hold the strap in a tight condition. It is a particular feature of the invention that the teeth that engage one another are in offset planes axially of the winch drum and are also staggered in a circumferential direction. Thus, the forces are distributed over a number of different teeth and are applied at different locations to enhance the overall structural integrity of the ratchet mechanism and minimize the possibility of tooth failure. Even if there should be a broken tooth, three other pairs of teeth remain in engagement to prevent the winch from completely releasing the load straps.

BRIEF DESCRIPTION OF THE DRAWINGS

The objects and features of the invention noted above are explained in more detail with reference to the drawings, in which like reference numerals denote like elements, and in which:

FIG. 1 is a fragmentary side elevational view of a flatbed truck on which a load is secured by tie-down straps which are each tightened by a winch constructed according to a preferred embodiment of the present invention;

FIG. 2 is an enlarged fragmentary elevational view showing one of the winches that serves to secure a tie-down strap in a tight condition, with the vehicle bed and the tie-down strap shown in broken lines;

FIG. 3 is a fragmentary elevational view taken generally along line 3—3 of FIG. 2 in the direction of the arrows and showing the pawl in its engaged position to lock the ratchet wheel in place;

FIG. 4 is a fragmentary elevational view similar to FIG. 3, but showing the pawl pivoted upwardly to release the ratchet wheel; and FIG. 5 is a fragmentary elevational view taken generally along line 5—5 of FIG. 2 in the direction of the arrows and showing a lever applied to the winch drum to facilitate tightening of the tie-down strap.

DETAILED DESCRIPTION OF THE INVENTION

Referring now to the drawings in more detail and initially to FIG. 1, numeral 10 designates the frame of a flatbed truck or other flatbed vehicle. The frame 10 is supported on wheels 12 and presents a flat bed 14 on which cargo 16 is carried. The cargo 16 may take a variety of forms and is tied down or restrained by a series of flexible tie-down straps 18. Each strap 18 has one end hooked or otherwise fixed in a secure manner to the side of the frame opposite the side that is visible in FIG. 1. The straps are drawn over the top of the cargo 16, and each strap is received at its other end and tightened by a winch 20 which is constructed in accordance with the present invention.

Referring now more particularly to FIG. 2, each winch 20 has a rigid frame 22 which has the shape of an inverted letter "U". The top or bight portion 22a of the frame 22 is connected with the frame 10 of the vehicle in a suitable manner. The bight section 22a may be bolted or welded to the underside of the bed 14. Alternatively, the frame 22 may be fitted into a track (not shown) which allows each winch to be adjusted in position forwardly and rearwardly along the vehicle frame.

The winch 20 includes a cylindrical winch drum 24 which extends between the flanges or sides 22b of the frame 22. The drum 24 extends through round openings in the frame sides 22b and is able to rotate about a horizontal axis which is parallel to the longitudinal axis of the vehicle. At least one and preferably two slots 26 are formed in the winch drum 24 so that the free end of the strap 18 can be threaded through the slots, thus securing the end of the strap so that the strap can be wound onto the drum 24 when it is rotated.

An enlarged collar 28 is rigidly connected with one end of the winch drum 24 and is located adjacent to the outside surface of one of the frame sides 22b. The collar 28 is larger in diameter than the drum 24 so that the collar cannot fit through the opening in the frame side 22b which receives the drum 24. The collar 28 has diametrically opposed openings 30 through which a cylindrical rod 32 (see FIG. 5) can be extended and used as a lever for turning of the winch drum 24.

A ratchet wheel 34 is rigidly connected with the end of the winch drum 24 opposite the collar 28. The ratchet wheel 34 is larger in diameter than the winch drum 24 and is located adjacent to the outer surface of one frame side 22b. Because the collar 28 and ratchet wheel 34 are larger than the openings in the frame sides through which the winch drum 24 extends, the winch drum 24 is prevented from moving axially relative to the frame 22, although it can rotate as previously described.

With additional reference to FIGS. 3 and 4, the ratchet wheel 34 includes on its periphery two different sets of teeth 36 and 38. The teeth 36 in the first set are located adjacent to the frame side 22b, and the teeth 38 in the other set are offset axially from the teeth 36, as best shown in FIG. 2. As shown in FIGS. 3 and 4, the teeth 36 and 38 are staggered relative to one another. Each of the teeth 36 is staggered in a circumferential direction relative to the adjacent pair of teeth 38 such that each tooth 36 is located generally midway between the adjacent pair of teeth 38. Likewise, teeth 38 are staggered circumferentially relative to the teeth 36 such that each tooth 38 is located substantially midway between the adjacent pair of teeth 36. The teeth 36 and 38 have substantially the same size and shape. Each tooth 36 and 38 has an inclined edge 40 which is a leading edge of the tooth when the ratchet wheel 34 is turned in a clockwise direction as viewed in FIGS. 3 and 4. The inclined leading edge 40 of each tooth terminates at a tip 42 of the tooth. A trailing edge 44 of each tooth provides an interlocking edge which serves to lock the ratchet wheel 34 in place, as will be more fully.

For ease of manufacture, the ratchet wheel 34 can be constructed by using two identical wheels and rotating one of them slightly until the teeth are staggered in the manner shown and described before welding or otherwise securing the adjacent faces of the two wheels together. Alternatively, the wheel can be constructed as an integral piece which is secured to the end of the winch drum 340

A pawl 46 interacts with the ratchet wheel 34. One end of the pawl 46 is pivotally secured at 48 to the outside surface of the frame side 22b which is adjacent to the ratchet wheel 34. The pivot coupling 48 provides a horizontal pivot axis about which the pawl 46 can pivot up and down between the engaged position shown in FIG. 3 and the release position shown in FIG. 4. The coupling 48 is located immediately above the axis of rotation of the winch drum 24, and the pivot axis for the pawl is thus located above and parallel to the rotational axis for the winch drum.

The pawl 46 has two sets of teeth 50 and 52 which are offset from one another in a direction axially of the winch drum 24. There are two of the teeth 50, and they are located and arranged to interlock with the first set of teeth 36 on the ratchet wheel 34 when the pawl is in the engaged position shown in FIG. 3. The other set of teeth 52 on the pawl also has two teeth, and they are located to interlock with the outer teeth 38 on the ratchet wheel when the pawl is in the engaged position. The teeth 50 and 52 are staggered such that one of the teeth 50 is located between the two teeth 52 and one of the teeth 52 is located between the two teeth 50. This staggered and offset arrangement of the teeth 50 and 52 matches the similar arrangement of the teeth 36 and 38 of the ratchet wheel. The end of the pawl 46 presents a tip 54 which may be gripped with the fingers in order to facilitate release of the pawl.

In use, the winch 20 of the present invention serves to tighten a corresponding strap 18 so that the strap is tightly stretched over the cargo 16 in order to effectively restrain it. After one end of the strap is hooked or suitably secured to one side of the vehicle frame, the strap 18 is drawn over the cargo 16 and is threaded through the slots 26. The winch drum 24 may be turned as far as possible by hand, preferably by turning the collar 28. The winch drum is turned in a clockwise direction as viewed in FIGS. 3 and 4 in order to wind the strap 18 onto the winch drum 24. Due to the influence of gravity, the pawl 46 drops to the engaged position shown in FIG. 3. Because of the inclined orientations of the leading edges 40 of the teeth 36 and 38, the teeth 36 and 38 are able to move along the mating teeth 50 and 52 of the pawl in ratcheting fashion when the winch drum 24 is turned in a clockwise direction as viewed in FIGS. 3 and 4. When it becomes too difficult to turn the winch drum by hand, the rod 32 may be inserted through openings 30 and used to provide leverage for additional turning of the winch drum. The winch drum is preferably tightened as much as possible in order to make certain that the straps 18 are in as tight a condition as possible to effectively restrain the cargo 16.

As the winch drum 24 is turned in order to tighten the straps, the engagement of the teeth 50 and 52 of the pawl with the teeth 36 and 38 of the ratchet wheel prevent the drum 24 from turning in a counter-clockwise direction as viewed in FIGS. 3 and 4. Consequently, the winch drum 24 can be progressively turned to tighten the strap 18 until the strap is stretched as tightly as possible. The engagement between the teeth of the pawl and the teeth of the ratchet wheel thereafter locks the winch such that the winch drum 24 cannot turn in a direction to loosen the strap 18. The force of gravity along with the frictional forces between the interlocked pawl teeth and ratchet wheel teeth assures that the winch will not slip while the cargo is being transported.

The provision of the two sets of mating teeth 50 and 36 and 52 and 38 on the pawl and ratchet wheel distributes the forces and stresses on the pawl and ratchet wheel. There are two pawl teeth 50 in engagement with two mating ratchet teeth 36, and there are likewise two additional pawl teeth 52 engaging two other ratchet teeth 38. Consequently, there are eight teeth that interlock with one another altogether, thus spreading the load out among the eight interlocking teeth. In addition, four of the interlocking teeth are in a plane that is offset from the plane in which the other four teeth interact. This results from the offset of the teeth 36 and 38 and 50 and 52 in a direction axially of the winch drum 24. Moreover, the staggered arrangement of the teeth 36 and 38 and 50 and 52 results in the application of force at different locations circumferentially of the winch drum 24. The overall result is that the forces are distributed among a large number of teeth, and the locations at which the forces are applied are offset both axially and circumferentially to avoid any concentration of stress that presents an area where structural failure would be likely.

It is thus evident that the ratchet wheel and pawl construction of the present invention distributes the stresses among a number of different teeth and also makes certain that the stresses are applied at different locations rather than being concentrated. It is also noted that even if one or more of the teeth should break or otherwise fail, there are still a number of teeth that remain engaged with one another to maintain the locked condition of the winch drum 24. In order to release the strap 18, the pawl 46 can be gripped by the tip 54 and pivoted upwardly to the release position shown in FIG. 4. Then, the winch drum 24 can be turned in a direction to release the strap 18 so that it can be removed for unloading of the cargo 16.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In a cargo tie-down system having at least one flexible strap secured at one end to a vehicle and drawn over cargo carried on the vehicle, a winch construction comprising:

a frame secured to the vehicle;

a winch drum mounted on said frame for rotation about a generally horizontal rotational axis, said drum being adapted to receive the strap and to wind the strap thereon;

a ratchet wheel carried on said drum and presenting first and second sets of ratchet teeth on the periphery of said wheel, the teeth in said first set being offset from the teeth in said second set in a direction axially of said drum and being staggered relative to the teeth in said second set with each tooth in the first set being situated between an adjacent pair of teeth in the second set; and a pawl connected with said frame for movement about a generally horizontal pivot axis between engaged and release positions, said pawl having first and second sets of pawl teeth offset and staggered in an arrangement to effect locking engagement between the first set of pawl teeth and the first set of ratchet teeth and between the second set of pawl teeth and the second set of ratchet teeth in the engaged position of the pawl to lock the winch drum against rotation in one direction.

2. A winch construction as set forth in claim 1, including a slot in said winch drum for receiving an end of the strap opposite said one end.

3. A winch construction for a cargo tie-down system used to secure cargo on a vehicle and including a flexible strap secured at one end to the vehicle and drawn over the cargo, said winch construction comprising:

a frame secured to the vehicle;

a winch drum mounted on said frame for rotation and adapted to receive and wind the strap thereon to tighten the strap on the cargo upon rotation of the winch drum in one direction;

a ratchet wheel carried on said drum and presenting first and second sets of ratchet teeth on the periphery of said wheel, the teeth in said first set being offset from the teeth in said second set in a direction axially of said drum and being staggered relative to the teeth in said second set with each tooth in the first set being situated between an adjacent pair of teeth in the second set; and a pawl connected with said frame for movement about a generally horizontal pivot axis between engaged and release positions, said pawl having first and second sets of pawl teeth offset and staggered in an arrangement to effect locking engagement between the first set of pawl teeth and the first set of ratchet teeth and between the second set of pawl teeth and the second set of ratchet teeth in the engaged position of the pawl to lock the winch drum against rotation in a direction opposite said one direction.

4. In a winch having a frame connected to a vehicle which carries cargo and a winch drum rotationally mounted on the frame to wind a flexible strap on the drum to tighten the strap on the cargo, the improvement comprising:

a ratchet wheel carried on said drum and presenting first and second sets of ratchet teeth on the periphery of said wheel, the teeth in said first set being offset from the teeth in said second set in a direction axially of said shaft and being staggered relative to the teeth in said second set with each tooth in the first set being situated between an adjacent pair of teeth in the second set; and a pawl connected with said frame for movement about a generally horizontal pivot axis between engaged and release positions, said pawl having first and second sets of pawl teeth offset and staggered in an arrangement to effect locking engagement between the first set of pawl teeth and the first set of ratchet teeth and between the second set of pawl teeth and the second set of ratchet teeth in the engaged position of the pawl to lock the winch drum against rotation in one direction.

* * * * *